(12) United States Patent
Bonnedal et al.

(10) Patent No.: US 6,421,169 B1
(45) Date of Patent: *Jul. 16, 2002

(54) OPTICAL FIBER AMPLIFIER HAVING VARIABLE GAIN

(75) Inventors: Dag Bonnedal; Johan Sandell, both of Enskede; Magnus Sundelin, Stocksund, all of (SE)

(73) Assignee: Telefonaktiebolaget LM Ericsson, Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/368,468

(22) Filed: Aug. 2, 1999

Related U.S. Application Data

(63) Continuation of application No. PCT/SE98/00255, filed on Feb. 13, 1998.

(30) Foreign Application Priority Data

Feb. 14, 1997 (SE) ................................................ 9700533

(51) Int. Cl.⁷ .................................................. G02B 6/28
(52) U.S. Cl. ................................ 359/337.1; 359/337.2; 359/341.41; 359/337.11; 359/337.13
(58) Field of Search ................................. 359/333, 337, 359/341, 177, 161, 337.11, 337.13, 341.4, 341.42, 337.112

(56) References Cited

U.S. PATENT DOCUMENTS 5,452,116 A        9/1995   Kirby et al.
5,812,710 A  *  9/1998   Sugaya .......................... 359/337
5,818,629 A  *  10/1998  Kinoshita ..................... 359/341

FOREIGN PATENT DOCUMENTS

EP        0563524 A1         10/1993
EP        0637148 A1          2/1995
JP          5241209      *    9/1993
JP          7212315      *    8/1995
JP       10242917 A      *    9/1998

OTHER PUBLICATIONS

Kenoshita et al, OSA Trends in Optics and Photonics, vol. 5 pp 49–52, Jul. 13, 1996.*

(List continued on next page.)

Primary Examiner—Nelson Moskowitz
(74) Attorney, Agent, or Firm—Nixon & Vanderhye P.C.

(57) ABSTRACT

An optical amplifier device intended for WDM light signals comprises a preamplifier (3) and a power amplifier (11) of the optical fiber amplifier type, which are connected in series and have gain curves dependent on the wavelength. A controllable attenuator (5) is connected between the amplifiers (3 and 11) and is controlled by a control device (7). The signal input to the preamplifier (3) has a low power and is amplified to provide an output signal where the signals of the input channels have been amplified with different gains. The input signal of the power amplifier (11) then has a larger power resulting in a gain characteristic different from that of the preamplifier (3). By adapting the attenuation of the attenuator (5) for variations in the input signal the gain characteristic of the power amplifier (11) can be set so that the signal output from the amplifier device has a spectral dependence that is the same as the original spectral dependence obtained without variations. Also, the same spectral dependence can be maintained when the pump light power of the power amplifier is changed and then the total amplifier gain is changed, by adapting the attenuation of the attenuator (5) so that the gain of the power amplifier is not changed. In the amplifier the lower possible noise from the preamplifier stage is added to the input signal and the full output power is always available from the power amplifier. If the input signal is e.g. increased the SNR of the signals passing through the amplifier is correspondingly improved. This improves the performance of an optical network in which the amplifier is used.

7 Claims, 1 Drawing Sheet

OTHER PUBLICATIONS

Sugaya et al, Techn. Reports of IEICE, OCS 95–36, pp 21–26 (Translation Provided), Jul. 1995.*

Bonnedal, D; OSA Trends in Opt. & Photonics, vol. 5, pp 53–56 (Abstract Only Herewith), Jul. 13, 1996.*

* cited by examiner

OPTICAL FIBER AMPLIFIER HAVING VARIABLE GAIN

This application is a continuation of PCT/SE98/00255, filed Feb. 13, 1998.

TECHNICAL FIELD

The present invention relates to an optical fiber amplifier having variable gain, to be used in particular in a WDM network, and also to a WDM network and a method of amplifying WDM light signals.

BACKGROUND

Optical fiber amplifiers have great advantages in optical wavelength multiplexed transmission systems (WDM systems), as they are capable of simultaneously amplifying a number of WDM channels.

Normally such amplifiers are operated in a saturated condition, this implying that they have an approximately constant output power that is independent of the input power. This further implies that the gain of the amplifier is inversely proportional to the input power. This is an advantage in most transmission systems, since amplifiers placed along a transmission path will then automatically adjust their gain to be equal to the losses between the amplifiers.

For WDM systems there is one problem related to this type of amplifier operation. The spectral dependence of the amplifier depends on the population inversion of the amplifying medium. An increasing inversion will shift the amplification towards shorter wavelengths and a gain tilt results. The gain in the saturated amplifier also depends on the degree of population inversion. This implies that the relative gain between the different WDM channels depends directly on the amplification of the amplifier. Gain variations will directly cause an imbalance of the gain between the channels and this will lead to different signal to noise ratios, SNR, at the receiver. The channel with the lowest SNR will set the limit for the performance of the whole system.

Normally an amplifier is dimensioned for one certain application, i.e. the input power level and the gain. When the system is installed and taken into operation the power levels have to be adjusted using attenuators. The remaining gain imbalance has to be handled by the, system within the allowed performance margins. The whole system has to be dimensioned for the worst case where attenuations are maximal in the transmission paths between each amplifier although most of the attenuations might be significantly lower in the actual installation. The total capacity of the transmission system will thus be significantly lower than it potentially could have been.

Methods of providing amplification with equal output power for the different WDM channels have also been presented. The optical WDM spectrum could be demultiplexed, the individual channel power levelled by a set of saturated amplifiers and finally multiplexed again, see U.S. Pat. Nos. 5,452,116 and 5,392,154. The active fiber could be cooled to cryogenic temperatures which will lead to the effect that the gain at each wavelength is saturated individually, so called Spectral Hole Burning, see U.S. Pat. No. 5,345,332. A wavelength tuneable filter with a suitable characteristic could partly compensate for the changes, see the article by R. A. Betts et al., "Split-beam Fourier filter and its application in a gain-flattened EDFA", Opt. Fiber Communications Conf., TuP4, San Diego, 1995. In specially prepared active fibers the spectral changes have been shown to have a reduced gain dependence, see J. Nilsson, Y. W. Lee and W. H. Choe, "Erbium doped fibre amplifier with dynamic gain flatness for WDM", Electron. Lett., Vol. 31, pp. 1578–1579, 1995.

These prior methods seem to be costly or complicated or to have a low performance.

SUMMARY

It is an object of the invention to provide an optical amplifier having a variable total gain and a constant spectral dependence within an optical transmission band.

It is another object of the invention to provide an optical amplifier having a constant spectral dependence for a varying power of the input light.

It is another object of the invention to provide a method of amplifying incoming, wavelength multiplexed light signals so that the signals are amplified to produce amplified light signals, where the gain for the different signals has a constant spectral dependence for a varying power of the total incoming light and for a variable total gain.

The problem solved by the invention is thus how to construct an optical amplifier that has a good performance, e.g. has better signal-to-noise ratios for higher input signals than for low signals, and that can be built at a reasonable cost.

Thus, an optical amplifier is provided that has a constant spectral dependence within the optical transmission band of a WDM system while the total gain of the amplifier can be varied without impairing the noise figure or the output power of the amplifier. The remaining spectral gain differences can be equalised with a fixed spectral filter if desired for example for a WDM system. The operation of the amplifier is based on the observation that a gain tilt in one amplifier stage in a two stage optical fiber amplifier can be corrected by a corresponding gain tilt having an opposite sign in another amplifier stage. The amplifier can thus be designed as a two stage amplifier where the first amplifier stage operates as a preamplifier stage in a more or less saturated state. The second stage of the amplifier operates as a power or booster amplifier stage in a fully saturated state with an almost constant output power. The gain of the second stage is adjusted by adjusting the power input to this stage in order to produce a gain tilt having a magnitude equal to and an opposite sign compared to the gain tilt of the preamplifier stage.

The adjustment of the input power of the second stage is preferably achieved by arranging a controllable optical attenuator placed between the two amplifier stages. This attenuator can be either manually or automatically controlled. An automatically controlled attenuator can be mechanically or directly electrically controlled by one of various known techniques.

The gain of the complete amplifier for a fixed input power can further be varied by varying the pump power to the power amplification stage and thereby varying the output power, the attenuation of the attenuator simultaneously then being varied correspondingly to maintain a constant gain of the output amplification stage.

The control of the attenuator can be done in one of various ways. For a manual attenuator the loss is adjusted at installation to be optimised for the actual loss of the line section preceding the amplifier. For an automatically controllable attenuator the loss can either be calculated from the measured input power using the well predictable behaviour of the amplifier, as e.g. presented in the paper by D. Bonnedal, "EDFA Gain, Described with a Black Box Model," in Optical Amplifiers and their Applications, 1996 Technical Digest (Optical Society of America, Washington D.C., 1996), pp. 215–218, or the channel power of two or more channels can actually be measured at the output and the difference there-between can be minimised by a controller algorithm. The channel power measurements can be made using one of several well known techniques such as imposing pilot tones of different frequencies on some or all channels and measuring the relative channel power by frequency discrimination in the electrical domain, see the published European patent application EP-A1 0 637 148 which corresponds to U.S. Pat. No. 5,463,487. Alternatively an analysis of the whole or part of the optical spectrum can be made by fixed or scanning optical filters, gratings or interferometers.

By placing an attenuator between the amplification stages the optimal performance of the two stages is not impaired. The lowest possible noise from the preamplifier stage is added to the signal in each case of operation and the full output power is always available from the power amplification stage. This means that if the loss between a pair of amplifiers is lowered the SNR is correspondingly improved. The full potential of the total optical transmission system can be utilised.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

A complete understanding of the invention and of the above and other features thereof may be gained from a consideration of the following detailed description of a non-limiting embodiment presented hereinbelow with reference to the accompanying drawings, in which.

DETAILED DESCRIPTION

Figure 1:
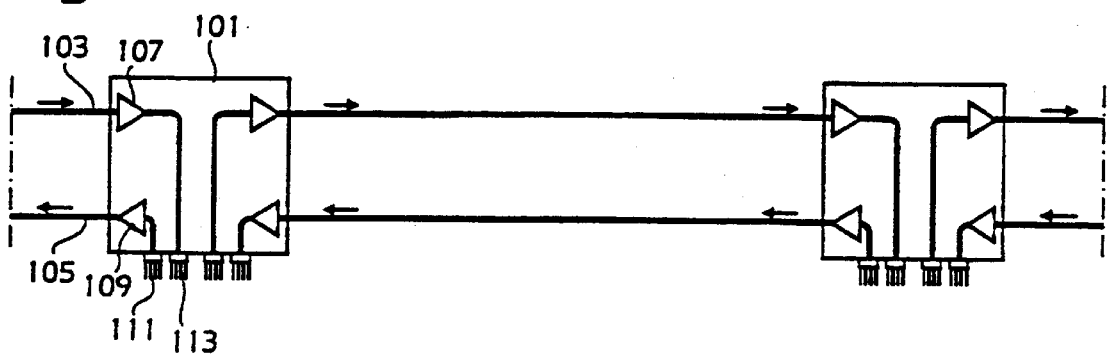
FIG. 1 is a diagram illustrating a portion of an optical fiber network.

In FIG. 1 a portion of an optical fiber WDM network is shown having nodes 101. Each node is connected to another node through one input fiber 103 and one output fiber 105. The input fibers are connected to preamplifiers 107 and the output fibers are connected to booster or power amplifiers 109. The preamplifiers 103 and the boosters 109 are in turn connected to electrical output and input ports 111, 113 respectively which comprise demultiplexers and multiplexers (couplers) respectively. It may be required to set the amplifiers 107, 109 to have suitably adapted gains depending on the purpose of the amplifier and it may also be required to change the gain during operation of the network. However, for amplifiers of type fiber optical amplifiers containing fibers having a doping of the rare-earth metal erbium, the values of the gain for different wavelengths are not equal to each other and even the dependence of the gain on the wavelength changes when the gain is altered, what results in problems related to e.g. differing signal-to-noise ratios. Amplifiers having a constant spectral dependence are advantageously used in such nodes and also as line amplifiers in a fiber optical network and they can be constructed as will now be described with reference to FIG. 2.

Figure 2:
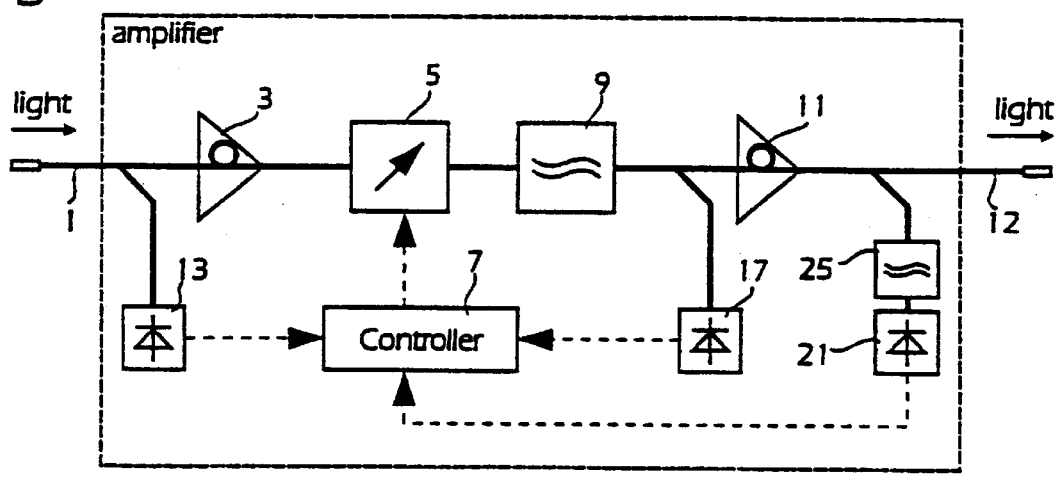
FIG. 2 is a block diagram of a constant spectral gain amplifier.

In the block diagram of an optical amplifier in FIG. 2 which is suitable for use in a node 101 of the network portion of FIG. 1, light enters the optical amplifier on an optical fiber 1. The optical fiber is connected to a first fiber optical amplifier 3, which acts as a preamplifier stage ampling the light received on the fiber 1. The preamplifier 3 has a fixed gain for providing a suitable output power for the expected input light power range. The output of the preamplifier stage 3 is provided to a controllable attenuator 5, which is connected to an electrical controller 7 and controlled thereby. The light attenuated by the attenuator 5 then enters a fixed wavelength flattening filter 9, which has its output connected to a power amplification stage or booster stage 11 comprising an optical fiber amplifier having a variable output power. The flattening filter 9 is optional and is not required for the basic operation of the amplifier. In the case where it is not included, the output of the attenuator 5 is connected directly to the input of the power amplification stage 11. The light output from the total amplifier device is obtained on the optical fiber 12 connected to the output terminal of the power amplifier stage 11.

The electrical controller 7 also receives signals from light detectors. Thus an input light power detector 13 has its input connected to a Y-coupler placed in the fiber 1 entering the amplifier. An intermediate power detector 17 is connected to the fiber line between the optional flattening filter 9 and the power amplification stage 11 through a Y-coupler spliced into the fiber between these devices. An output power detector 21 is connected to the output of the power amplification stage 11 through a Y-coupler 23 located in the output line 12. An optional spectrum analysing device 25 such as a spectral filter can be connected in the input line of the output power detector 21.

The operation of the amplifier of FIG. 2 will now be described. It is based on the fact that in an optical fiber amplifier such as that included in the preamplifier stage 3 and the power amplification stage 9 the gain can be written in a very good approximation as a linear combination or a linear interpolation of two known spectra, provided that the gain values are expressed in a logarithmic unit such as dB, see the paper by Dag Bonnedal cited above. The gain spectrum for an input power $P_{in}$ can be written as $$G_k(\lambda) = G_b(\lambda) + k(G_a(\lambda) - G_b(\lambda)) \text{ [dB-units]} \quad (1)$$

where k is a constant that is independent of the wavelength $\lambda$ and $G_a(\lambda)$ and $G_b(\lambda)$ are the gain for other input power values. The constant k depends on the input power and on the pump power. For two identically constructed optical fiber amplifiers No. 1 and 2 the gain is $$G_k(\lambda) = G_b(\lambda) + k_1(G_a(\lambda) - G_b(\lambda)) \text{ [dB-units]} \quad (2)$$

$$G_k(\lambda) = G_b(\lambda) + k_2(G_a(\lambda) - G_b(\lambda)) \text{ [dB-units]} \quad (3)$$

where $k_1$ and $k_2$ are constants depending on the input power of and the pump power of the respective amplifier. If the two amplifiers are connected in series and an attenuator having a flat attenuation of A dB is connected therebetween, the total gain will be $$G_{tot}(\lambda) = 2 \cdot G_b(\lambda) - A + (k_1 + k_2) \cdot (G_a(\lambda) - G_b(\lambda)) \text{ [dB-units]} \quad (4)$$

Thus, first assume that the preamplifying and booster stages 3, 11 and the attenuator 5 which is supposed to have a flat attenuation, i.e. the same attenuation for all considered wavelengths, have been set to give a total gain curve according to Eq. (4). Then suppose, that the power input to the preamplifying stage 3 is changed, and then the gain therein is changed ad the constant $k_1$, is changed to $(k_1+\Delta k_1)$. The total gain of the amplifier is then also changed according to Eq. (4). The attenuation is automatically controlled to a new value $(A+\Delta A)$ by sending suitable signals from the controller 7 to the attenuator 5. The input power to the power amplification stage 11 is then changed resulting in a change of the constant $k_2$ to $(k_2+\Delta k_2)$. The resulting gain is $$G_{tot}(\lambda)=2\cdot G_b(\lambda)-(A+\Delta A)+(k_1+k_2+\Delta k_1+\Delta k_2)\cdot(G_a(\lambda)-G_b(\lambda))\text{[dB-units]} \quad (5)$$

If here $\Delta A$ is adjusted, so that the condition $\Delta k_2=-\Delta k_1$ is satisfied, the resulting gain is $$G_{tot}(\lambda)=2\cdot G_b(\lambda)-A-\Delta A+(k_1+k_2)\cdot(G_a(\lambda)-G_b(\lambda)) \text{ [dB-units]} \quad (6)$$

which means that the resulting gain is proportional to the previous, initial or set one and that thus the spectral dependence of the gain is essentially unchanged.

In another case, the pump light power input to the power amplification stage 11 is changed, resulting in a changed output power of the total amplifier and also a change of the constant $k_2$ in Eq. (1). The attenuation A of the attenuator 5 can then be varied to a new value A', so that the gain still is $k_2$ of the power stage 11, resulting in a total gain of $$G_{tot}(\lambda)=2\cdot G_b(\lambda)-A'+(k_1+k_2)\cdot(G_a(\lambda)-G_b(\lambda)) \text{ [dB-units]} \quad (7)$$

which is also proportional to the originally set gain.

If the optional gain flattening filter 9 is used, it should ideally be designed to have the attenuation (at least within some considered wavelength band containing the WDM channels)

$$A_{gf}(\lambda)=-(2\cdot G_b(\lambda)+(k_1+k_2)\cdot(G_a(\lambda)-G_b(\lambda)))-A_{gf0} \text{ [dB-units]} \quad (8)$$

where $A_{gf0}$ is a constant. This will result in a total gain of the complete amplifier which is independent on the wavelength.

The attenuator 5 is automatically and electrically controlled by the control unit 7 but could also be manually controlled. The gain of the complete amplifier for a fixed input power is varied by varying the pump power of the optical fiber amplifier of the power amplification stage 11 or in other ways, e.g. as described in the Swedish patent application 9603337-8, see in particular the description of FIG. 6. Then the attenuation of the attenuator 5 is simultaneously varied correspondingly to maintain a constant gain of the power amplification stage 11 according to the discussion above (Eq. (7)) by using the signals of the detectors 17 and 21 sensing the input and output power of the power amplification stage 11. For the automatically controllable attenuator 5 the loss (attenuation thereof can be calculated from the input power measured by the input detector 13 and the light power as measured by the intermediate detector 17 provided that the behaviour and setting of the preamplification stage 3 is known. In some cases an additional light detector may be needed sensing the power input to the controllable attenuator (and then also the output power of the preamplifier stage 3 which may assist in controlling the gain thereof).

For a variation of the input power of the amplifier, this is sensed by the input detector 13 and then the attenuation of the filter 5 is controlled to compensate the change by modifying its output signal so that also the gain of the power amplification stage 11 is changed, compare Eqs. (5) and (6). This control can be made by using only the known behaviour of the amplification stages 3, 11, where the gain and the constant k can be deducted from the respective input power sensed by the detectors 13 and 17, such as by using the functional relationship presented in the paper by Dag Bonnedal cited above, see Eq. (1) in this paper:

$$G = \left(G_0^{-\alpha} + \left(\frac{P_{\lim}}{P_{in}}\right)^{-\alpha}\right)^{-\frac{1}{\alpha}} + L \quad \text{[linear units]} \quad (9)$$

for one considered wavelength, $P_{in}$ being the input power, $G_0$ being the gain for an unsaturated amplifier, $P_{lim}$ the maximum output power of the amplifier, $\alpha$ an exponent in the range of 0.5–1.5 and L a constant. The value k is then calculated from $$k = \frac{G_k - G_b}{G_a - G_b} \quad \text{[dB-units]} \quad (10)$$

Alternatively, for having a feedback control of the attenuator 5 and the power amplification stage 11 in this case for a varying input power, in some way the spectral profile of the light output from the power amplification stage 11 must be determined and then be controlled to be proportional to that initially set, see Eqs. (5) and (6). It can be made by measuring the channel power of two or more WDM channels at the output by means of having the suitably adapted spectral filter 25 selecting these channels to the output light detector 21. In another embodiment, no spectral filter 25 is required but suitably chosen, different pilot tones have been imposed on the signals in the channels so that the individual channel powers can be measured by filtering the electrical signal obtained from the light detector 21 around the frequencies of the pilot tones and then measuring the amplitudes of the tones.

Often different lengths of the amplifying fibers are used in the two stages to give the preamplifier stage a lower maximum gain in order to impose less noise and the power amplification stage a larger gain in order to obtain a higher efficiency. It will mean that the basic curves $G_a(\lambda)$ and $G_b(\lambda)$ in Eqs. (2) and (3) expressing the wavelength dependence are not quite identical to each other for the two amplifier stages, but still they may be sufficiently similar. Then an accurate control according to the description above cannot be made, but still, within a sufficiently narrow wavelength interval, e.g. between 1540 and 1560 nm or for wavelengths within an even more narrow band around a frequency of 1550 nm, the control can be made in a way achieving an approximately constant spectral dependence of the overall gain of the amplifier.

Additional advantages and modifications will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents.

What is claimed is:

1. An optical amplifying device receiving input light to be amplified and providing amplified output light, the optical amplifying device comprising:

a first optical fiber amplifier and a second optical fiber amplifier that are identically constructed, the first optical fiber amplifier receiving the light to be amplified and the second optical fiber amplifier providing the amplified output light, the first and second optical fiber amplifiers having in dB-units a gain spectrum for an input power $P_{in,i}$ to the respective one of the first and second optical fiber amplifier $G_{ki}(\lambda)=G_b(\lambda)+k_i(G_a(\lambda)-G_b(\lambda))$, where $\lambda$ is the wavelength, $k_i$ is a constant dependent on the input power $P_{in,i}$ and on power of pump light provided to the respective amplifier i and independent of the wavelength $\lambda$, and $G_a(\lambda)$ and $G_b(\lambda)$ are gain spectra for two input power values different from each other;

an attenuator connected between the first and second optical fiber amplifiers, the attenuator controllable to have a flat attenuation A in dB-units that is adjustable to values constant within a wavelength band;

a control device connected to the attenuator for controlling the attenuation A thereof, the control device being adapted to control:

for a change of the power $P_{in,1}$ of the input light to be amplified and received by the first optical fiber amplifier, the change changing the gain spectrum of the first optical fiber amplifier and thereby the constant $k_1$, the attenuation A to make the gain spectrum of the second fiber optical amplifier and thereby the constant $k_2$ change in such a way, that the amplified output light has the same spectral dependence as the amplified output light before the change, and for a change of the power of pump light provided to the second optical amplifier and thereby a change of the constant $k_2$, the attenuation A to make the gain spectrum of the second fiber optical amplifier and thereby the constant $k_2$ change in such a way, that the amplified output light has the same spectral dependence as the amplified output light before the change.

2. The optical amplifying device of claim 1, wherein for a change of the power $P_{in,1}$ of the input light to be amplified changing the constant $k_1$ to $(k_1+\Delta k_1)$ and the constant $k_2$ to $(k_2+\Delta k_2)$, the control device changes the attenuation A to a value so that condition $\Delta k_2=-\Delta k_1$ is satisfied.

3. The optical amplifying device of claim 1, wherein for a change of the power of pump light provided to the second optical amplifier changing the constant $k_2$ to $(k_2+\Delta k_2)$, the control device changes the attenuation A to a value so that condition $\Delta k_2=0$ is satisfied.

4. The optical amplifying device of claim 1, further comprising a gain flattening filter connected between the first and second optical fiber amplifiers for providing a compensation of the spectral dependence so that a gain of the optical amplifying device is substantially independent of the wavelength of the input light to be amplified.

5. The optical amplifying device of claim 1, further comprising light detectors connected to sense the power of light input to the second amplifier and of light output from the second amplifier and connected to provide signals to the control device for controlling the attenuation of the attenuator.

6. The optical amplifying device of claim 1, further comprising a light detector provided with a filter connected to sense the power of the output amplified light at at least two different wavelengths and connected to provide a signal to the control device for controlling the attenuation of the attenuator.

7. The optical amplifying device of claim 1, further comprising a light detector connected to sense the power of the input light to be amplified and connected to provide a signal to the control device for controlling the attenuation of the attentuator.

* * * * *